US009033852B2

(12) United States Patent
Horiike et al.

(10) Patent No.: US 9,033,852 B2
(45) Date of Patent: May 19, 2015

(54) HYDRAULIC CONTROL DEVICE AND CONTROL METHOD OF HYDRAULIC CONTROL DEVICE

(71) Applicants: Kenta Horiike, Toyota (JP); Kei Yuasa, Toyota (JP); Sei Kojima, Okazaki (JP); Hiromitsu Nitani, Nisshin (JP)

(72) Inventors: Kenta Horiike, Toyota (JP); Kei Yuasa, Toyota (JP); Sei Kojima, Okazaki (JP); Hiromitsu Nitani, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/243,666

(22) Filed: Apr. 2, 2014

(65) Prior Publication Data

US 2014/0302965 A1 Oct. 9, 2014

(30) Foreign Application Priority Data

Apr. 8, 2013 (JP) ................................ 2013-080651

(51) Int. Cl.
*F16H 61/48* (2006.01)
*B60W 10/02* (2006.01)
*B60W 10/04* (2006.01)

(52) U.S. Cl.
CPC ............. *B60W 10/023* (2013.01); *B60W 10/04* (2013.01)

(58) Field of Classification Search
None
See application file for complete search history.

(56) References Cited

U.S. PATENT DOCUMENTS

| | | | |
|---|---|---|---|
| 6,556,910 B2* | 4/2003 | Suzuki et al. ................... 701/54 |
| 6,709,363 B2* | 3/2004 | Shimabukuro et al. ........ 477/115 |
| 7,693,636 B2* | 4/2010 | Katou et al. ..................... 701/54 |
| 7,951,026 B2* | 5/2011 | Soga et al. ........................ 474/28 |
| 8,323,148 B2* | 12/2012 | Ohashi et al. .................... 477/83 |
| 8,840,524 B2* | 9/2014 | Arsenault et al. ................. 477/5 |
| 2009/0065318 A1 | 3/2009 | Soga et al. |
| 2009/0069131 A1 | 3/2009 | Soga |
| 2009/0069146 A1 | 3/2009 | Soga |
| 2010/0236231 A1 | 9/2010 | Miyabe et al. |

FOREIGN PATENT DOCUMENTS

| | | |
|---|---|---|
| JP | 62-073151 U | 5/1987 |
| JP | 2008-116005 A | 5/2008 |
| JP | 2009-068520 A | 4/2009 |
| JP | 2009-068521 A | 4/2009 |
| JP | 2009-068524 A | 4/2009 |
| JP | 2010-216643 A | 9/2010 |

* cited by examiner

*Primary Examiner* — Dirk Wright
(74) *Attorney, Agent, or Firm* — Gifford, Krass, Sprinkle, Anderson & Citkowski, P.C.

(57) ABSTRACT

In hydraulic control, an electronic control unit controls controlled hydraulic pressure of a control valve in order to control a hydraulic oil amount in a torque converter and a hydraulic oil pressure of a forward-reverse travel switching mechanism, and the electronic control unit increases the controlled hydraulic pressure when the hydraulic oil amount in the torque converter is insufficient at an engine start or immediately after the engine start in comparison with a case where the hydraulic oil amount in the torque converter is sufficient. The hydraulic control device includes: the torque converter; the forward-reverse travel switching mechanism; the control valve configured to change the hydraulic oil amount in the torque converter and the hydraulic oil pressure of the forward-reverse travel switching mechanism by changing the single controlled hydraulic pressure; and electronic control unit.

6 Claims, 4 Drawing Sheets

HYDRAULIC CONTROL DEVICE AND CONTROL METHOD OF HYDRAULIC CONTROL DEVICE

INCORPORATION BY REFERENCE

The disclosure of Japanese Patent Application No. 2013-080651 filed on Apr. 8, 2013 including the specification, drawings and abstract is incorporated herein by reference in its entirety.

BACKGROUND OF THE INVENTION

1. Field of the Invention

The present invention relates to a hydraulic control device for a vehicle drive apparatus and a control method of a hydraulic control device.

2. Description of Related Art

Japanese Patent Application Publication No. 2009-068524 (JP 2009-068524 A) discloses a hydraulic control device for controlling a hydraulic oil pressure of a forward/reverse travel switching mechanism and a hydraulic oil amount in a torque converter by one control valve. The hydraulic control device uses the control valve to supply the hydraulic oil at the same (single) hydraulic pressure to the torque converter and the forward/reverse travel switching mechanism through an oil passage.

SUMMARY OF THE INVENTION

In the hydraulic control device disclosed in JP 2009-068524 A, it is necessary to set the hydraulic oil pressure, which is supplied from the control valve to the forward-reverse travel switching mechanism, as low as possible during a normal operation in order to suppress a shock of clutch engagement and to improve fuel economy by cutting down a consumed amount of the hydraulic oil.

However, the hydraulic control device disclosed in JP 2009-068524 A uses the one control valve to control both of the hydraulic oil pressure of the forward-reverse travel switching mechanism and the hydraulic oil amount of the torque converter. Thus, the hydraulic oil amount that is supplied to the torque converter is also controlled to be small.

Accordingly, in a case where a vehicle has not been operated for a long period and the hydraulic oil amount in the torque converter is thereby reduced, if a vehicle is started immediately after an engine start, an sufficient amount of the hydraulic oil cannot be supplied to the torque converter in a timely manner, and this may cause failure in torque transmission.

The present invention provides a hydraulic control device capable of suppressing a shock of clutch engagement, a consumed amount of hydraulic oil, and failure in torque transmission, and also provides a control method of a hydraulic control device.

A first aspect of the present invention relates to a hydraulic control device for a vehicle including an engine. The hydraulic control device includes a torque converter, a forward-reverse travel switching mechanism, a control valve, and an electronic control unit. A torque converter is configured to transmit rotary power of the engine via hydraulic oil. A forward-reverse travel switching mechanism includes a frictional engagement element for travel that is engaged or disengaged based on a hydraulic oil pressure. The forward-reverse travel switching mechanism is configured to switch a rotational direction of the rotary power transmitted from the torque converter by engagement or disengagement of the frictional engagement element. A control valve is configured to change a hydraulic oil amount in the torque converter and the hydraulic oil pressure of the forward-reverse travel switching mechanism by changing a single controlled hydraulic pressure. An electronic control unit is configured to control the single controlled hydraulic pressure of the control valve to control the hydraulic oil amount in the torque converter and the hydraulic oil pressure of the forward-reverse travel switching mechanism. The electronic control unit is configured to increase the single controlled hydraulic pressure when the hydraulic oil amount in the torque converter is insufficient at a start of the engine or immediately after the start of the engine than that when the hydraulic oil amount in the torque converter is sufficient at the start of the engine or immediately after the start of the engine.

According to the above configuration, the controlled hydraulic pressure is increased when the hydraulic oil amount in the torque converter is insufficient at the engine start or immediately after the engine start in comparison with the case where the hydraulic oil amount in the torque converter is sufficient. Accordingly, when the hydraulic oil amount in the torque converter is insufficient at the engine start of immediately after the engine start, the hydraulic oil amount in the torque converter can rapidly be filled, and thus failure in torque transmission can be suppressed. Furthermore, when the hydraulic oil amount in the torque converter is sufficient at the engine start or immediately after the engine start, the controlled hydraulic pressure can be controlled to be low (that is, the controlled hydraulic pressure can be controlled to be low during the normal operation), and it is thereby possible to suppress a shock of clutch engagement and a consumed amount of the hydraulic oil.

In the hydraulic control device, the electronic control unit may be configured to control the controlled hydraulic pressure to be a minimum hydraulic pressure that is required for engagement of the frictional engagement element when the hydraulic oil amount in the torque converter is sufficient, and may be configured to control the controlled hydraulic pressure to be a hydraulic pressure that is higher than the minimum hydraulic pressure when the hydraulic oil amount in the torque converter is insufficient.

According to the above configuration, when the hydraulic oil amount in the torque converter is sufficient, the controlled hydraulic pressure is controlled to be the minimum hydraulic pressure that is required for the clutch engagement. Thus, it is possible to further suppress the shock of the clutch engagement and the consumed amount of the hydraulic oil. Meanwhile, when the hydraulic oil amount in the torque converter is insufficient, the controlled hydraulic pressure is controlled to be the hydraulic pressure that is higher than the minimum hydraulic pressure. Thus, the hydraulic oil amount in the torque converter can rapidly be filled, and thus the failure in torque transmission can be suppressed.

In the hydraulic control device, the electronic control unit may be configured to determine that the hydraulic oil amount in the torque converter is insufficient when differential rotation between a speed of the engine and a rotational speed of a turbine runner in the torque converter is specified differential rotation or higher.

According to the above configuration, when the differential rotation between the engine speed and the turbine rotational speed of the torque converter is specified threshold differential rotation or higher, it is determined that the hydraulic oil amount in the torque converter is insufficient. Accordingly, it is possible by using the differential rotation between the engine speed and the turbine rotational speed of the torque converter to determine whether the hydraulic oil amount in the torque converter is insufficient.

The hydraulic control device may further include a transmission that changes a speed ratio of the rotary power transmitted from the forward-reverse travel switching mechanism, and the electronic control unit may be configured to determine that the hydraulic oil amount in the torque converter is insufficient when a temperature of lubricating oil in the transmission is a specified temperature or lower.

According to the above configuration, when the temperature of the lubricating oil in the transmission is a specified threshold temperature or lower, it is determined that the hydraulic oil amount in the torque converter is insufficient. Thus, it is possible by using the temperature of the lubricating oil in the transmission to determine whether the hydraulic oil amount in the torque converter is insufficient.

In the hydraulic control device, the electronic control unit may be configured to determine that the hydraulic oil amount in the torque converter is insufficient when a rest time from an engine stop is a specified time or longer.

According to the above configuration, when the rest time from the engine stop is a specified threshold time or longer, it is determined that the hydraulic oil amount in the torque converter is insufficient. Thus, it is possible by using the rest time from the engine stop to determine whether the hydraulic oil amount in the torque converter is insufficient.

A second aspect of the present invention relates to a control method of a hydraulic control device for a vehicle including an engine. The hydraulic control device includes a torque converter, a forward-reverse travel switching mechanism, a control valve, and an electronic control unit. The control valve is configured to change a hydraulic oil amount in the torque converter and the hydraulic oil pressure of the forward-reverse travel switching mechanism by changing a single controlled hydraulic pressure. The control method includes: controlling the single controlled hydraulic pressure of the control valve by an electronic control unit in order to control the hydraulic oil amount in the torque converter and the hydraulic oil pressure of the forward-reverse travel switching mechanism; and increasing the single controlled hydraulic pressure when the hydraulic oil amount in the torque converter is insufficient at a start of the engine or immediately after the start of the engine than that when the hydraulic oil amount in the torque converter is sufficient at the start of the engine or immediately after the start of the engine.

According to the hydraulic control device and the control method of the hydraulic control device in the present invention, it is possible to suppress a shock of clutch engagement and a consumed amount of the hydraulic oil, and is further possible to suppress failure in torque transmission.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on embodiments of the present invention with reference to the accompanying drawings.

First Embodiment

Figure 1:
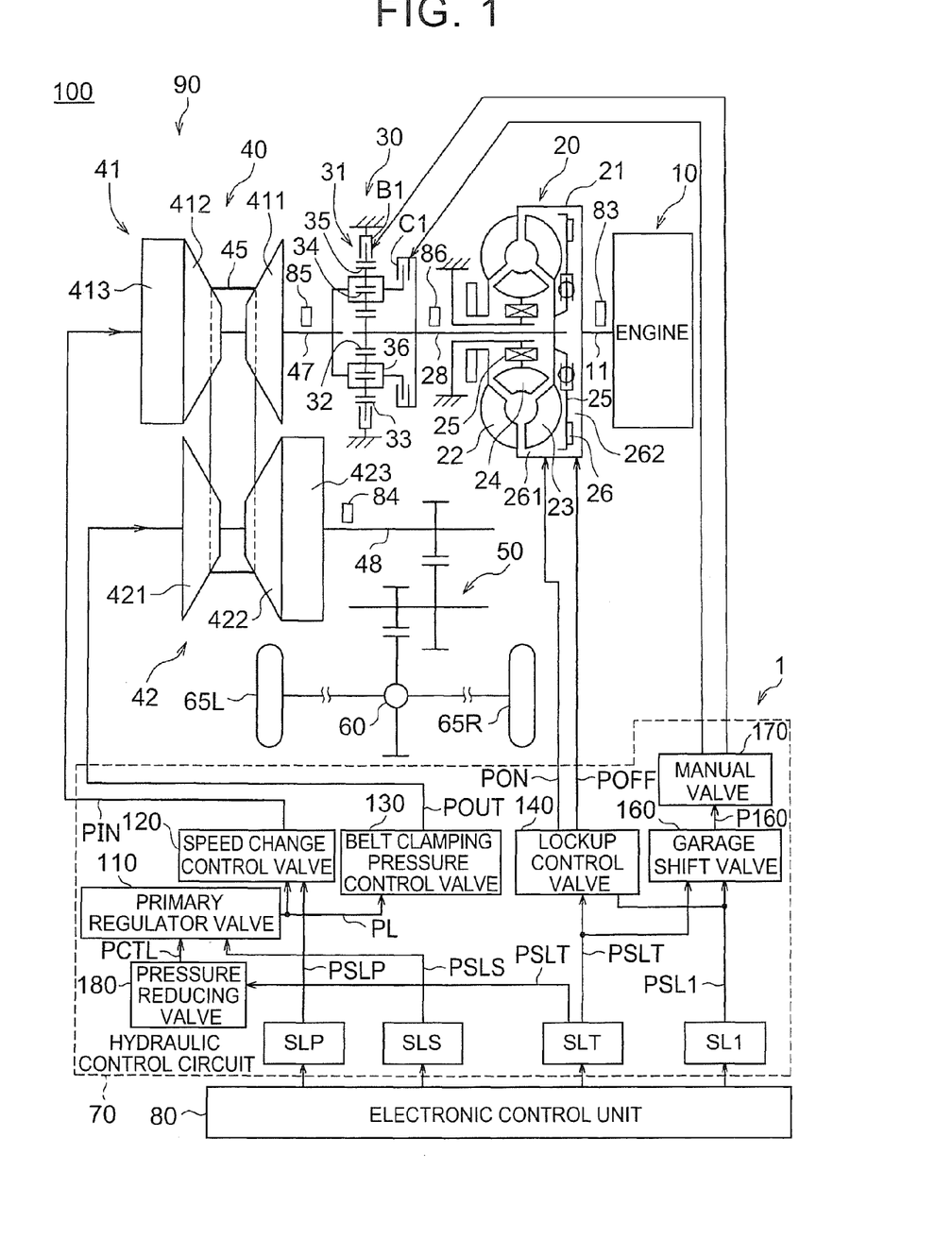
FIG. 1 is a schematic configuration diagram of a vehicle drive apparatus in which a hydraulic control device according to a first embodiment of the present invention is mounted.
Figure 2:
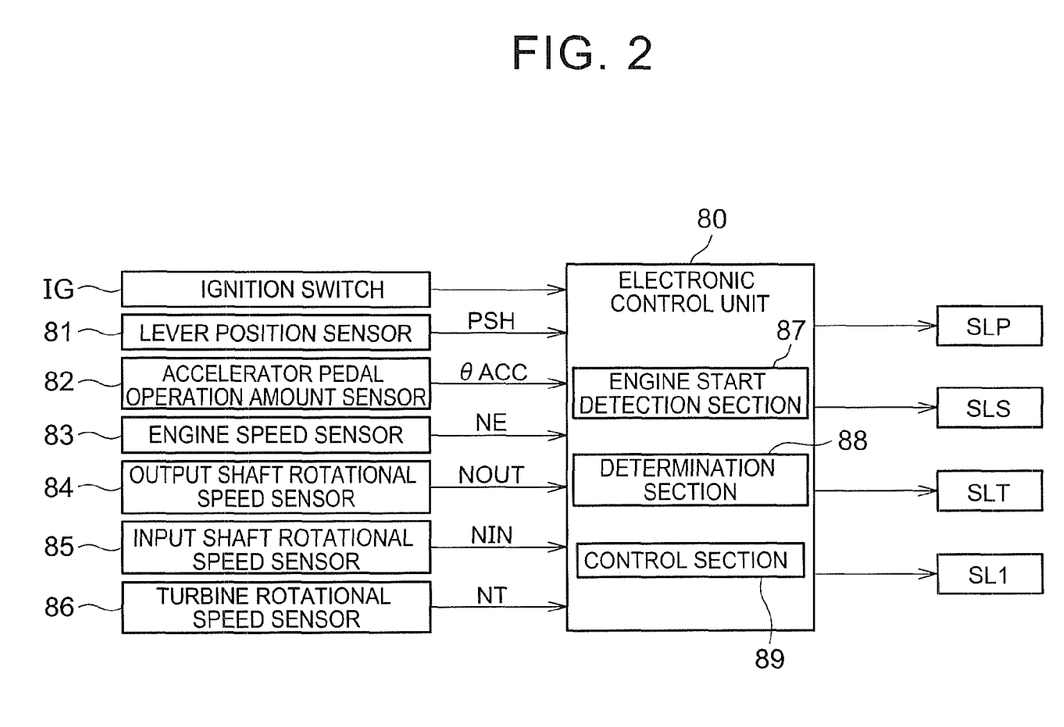
FIG. 2 is a schematic configuration diagram of main components of an electronic control unit in FIG. 1.
Figure 3:
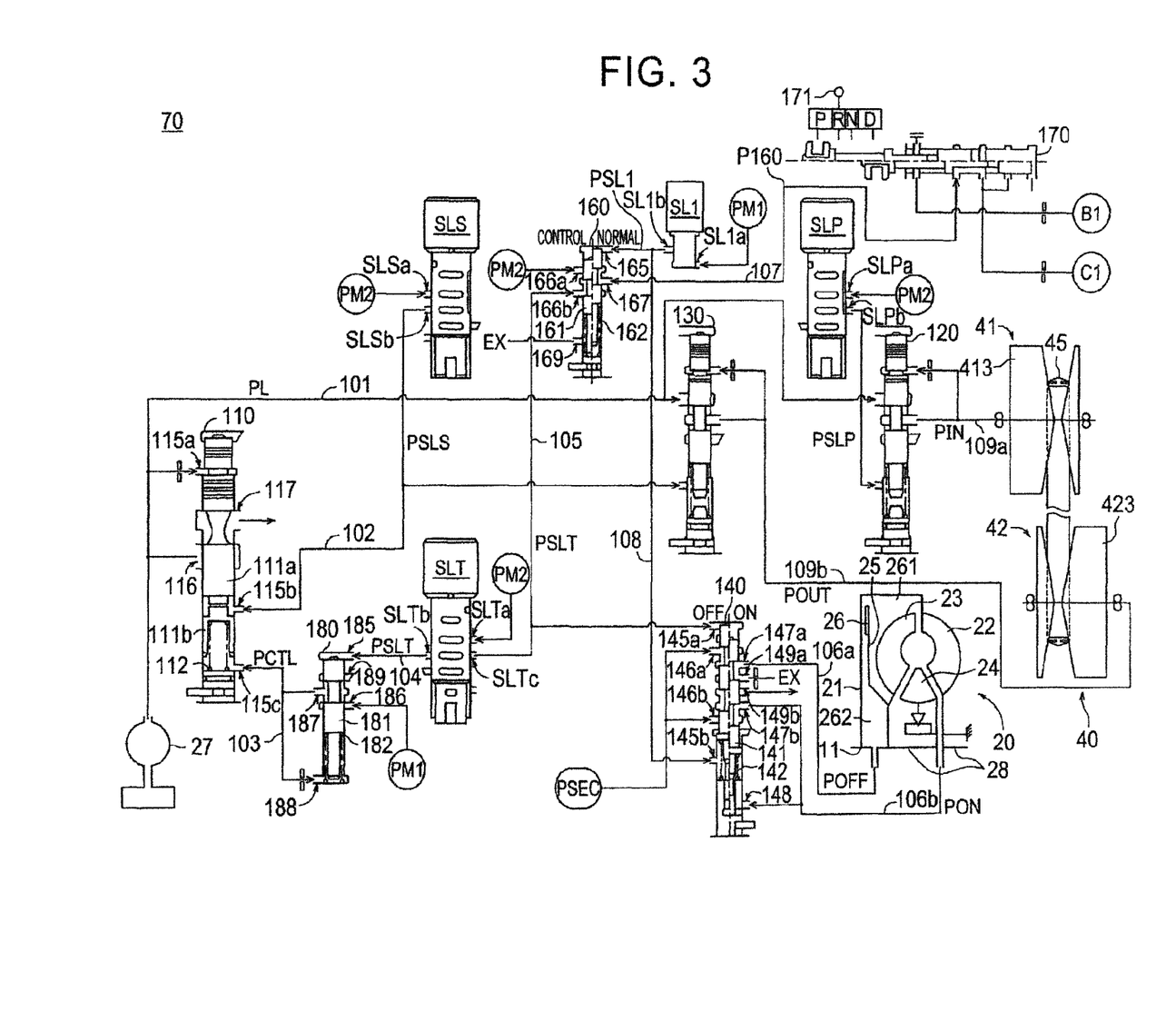
FIG. 3 is a view for showing a concrete example of a hydraulic control circuit in FIG. 1.

<Description of Configuration>
FIG. 1 is a schematic configuration diagram of a vehicle drive apparatus in which a hydraulic control device according to a first embodiment of the present invention is mounted. FIG. 2 is a schematic configuration diagram of main components of an electronic control unit in FIG. 1. FIG. 3 is a view for showing a concrete example of a hydraulic control circuit in FIG. 1.

As shown in FIG. 1, a hydraulic control device 1 according to this embodiment is mounted in a vehicle drive apparatus 100 and hydraulically controls a torque converter 20, a forward/reverse travel switching mechanism (a forward-reverse travel switching mechanism) 30, a continuously variable transmission 40, and the like. The hydraulic control device 1 includes a control valve (linear solenoid valve SLT) for controlling a hydraulic oil amount in the torque converter 20 and a hydraulic oil pressure of the forward/reverse travel switching mechanism 30 by a same (single) controlled hydraulic pressure (output hydraulic pressure PSLT). If the hydraulic oil amount in the torque converter 20 is insufficient at a start of an engine 10 or immediately after the start of the engine 10 (namely, in a period that a specified time elapses from the start of the engine 10), the control valve is used to increase the controlled hydraulic pressure PSLT in comparison with a case where the hydraulic oil amount in the torque converter 20 is sufficient. A detailed description will hereinafter be made on the vehicle drive apparatus 100 in which the hydraulic control device 1 according to this embodiment is mounted.

The vehicle drive apparatus 100 of this embodiment is favorably adopted for a front-engine front-wheel-drive (FF) vehicle, for example. As shown in FIG. 1, the vehicle drive apparatus 100 includes the engine 10, the torque converter 20, the forward/reverse travel switching mechanism 30, the belt-type continuously variable transmission 40, a reduction gear mechanism 50, a differential gear mechanism 60, a hydraulic control circuit 70, and an electronic control unit 80.

In this embodiment, the torque converter 20, the forward/reverse travel switching mechanism 30, the continuously variable transmission 40, the reduction gear mechanism 50, and the differential gear mechanism 60 constitute a power transmission system 90 for transmitting rotary power of the engine 10 to left and right drive wheels 65L, 65R. In addition, the hydraulic control device 1 at least includes the power transmission system 90, the hydraulic control circuit 70, and the electronic control unit 80.

In the power transmission system 90, the rotary power of the engine 10 is transmitted in an order of the torque converter 20, the forward/reverse travel switching mechanism 30, the continuously variable transmission 40, the reduction gear mechanism 50, and the differential gear mechanism 60, and is distributed to the left and right drive wheels 65L, 65R.

The torque converter 20 transmits the rotary power of the engine 10 to the forward/reverse travel switching mechanism 30 via the hydraulic oil. The torque converter 20 includes a front cover 21, a pump impeller 22, a turbine runner 23, a support member 25, a lockup clutch 26, and a turbine shaft 28.

The front cover 21 is connected to an output shaft 11 of the engine 10. The pump impeller 22 is connected to the output shaft 11 via the front cover 21. In the front cover 21, the turbine runner 23 is connected to the turbine shaft 28 while facing the pump impeller 22. The turbine shaft 28 is connected to a sun gear 32 of the forward/reverse travel switching mechanism 30. The lockup clutch 26 directly connects/disconnects the pump impeller 22 to/from the turbine runner 23 by hydraulic control of the hydraulic control circuit 70, and is disposed in the support member 25 while facing an inner surface of the front cover 21. The support member 25 supports the lockup clutch 26 and is disposed on the turbine shaft 28 in a manner capable of approaching and separating from the inner surface of the front cover 21. The support member 25 divides an inner space of the front cover 21 into a space (engagement-side hydraulic chamber) 261 where the pump impeller 22 and the turbine runner 23 are disposed and a space (disengagement-side hydraulic chamber) 262 where the lockup clutch 26 is disposed. A hydraulic pressure (lockup engagement hydraulic pressure) PON in the engagement-side hydraulic chamber 261 and a hydraulic pressure (lockup disengagement hydraulic pressure) POFF in the disengagement-side hydraulic chamber 262 are controlled by the controlled hydraulic pressure PSLT that is supplied from the hydraulic control circuit 70. The power is transmitted between the pump impeller 22 and the turbine runner 23 via the hydraulic oil in the engagement-side hydraulic chamber 261. The hydraulic oil in the engagement-side hydraulic chamber 261 is also referred to as the hydraulic oil in the torque converter 20.

In the torque converter 20, when the hydraulic control circuit 70 hydraulically controls a lockup differential pressure $\Delta P$ (=PON−POFF) to fall below a specified differential pressure $\Delta P1$, the support member 25 is moved to disengage the lockup clutch 26 (that is, the lockup clutch 26 is separated from the inner surface of the front cover 21), and the direct connection between the pump impeller 22 and the turbine runner 23 is cancelled. In this disconnected state, the pump impeller 22 is rotated by the rotary power of the engine 10, rotation thereof is transmitted to the turbine runner 23 to cause rotation thereof via the hydraulic oil in the engagement-side hydraulic chamber 261 and the turbine shaft 28 is rotated thereafter. Just as described, the rotary power of the engine 10 is transmitted via the hydraulic oil in the engagement-side hydraulic chamber 261.

On the other hand, when the hydraulic control circuit 70 hydraulically controls the lockup differential pressure $\Delta P$ to be the specified differential pressure $\Delta P1$ or higher, the support member 25 is moved to engage the lockup clutch 26 (that is, the lockup clutch 26 is fully engaged with the inner surface of the front cover 21), and the pump impeller 22 is directly connected to the turbine runner 23 therethrough. In this directly connected state, the rotary power of the engine 10 is transmitted in an order of the output shaft 11, the front cover 21, the lockup clutch 26, and the turbine shaft 28. Accordingly, the rotary power of the engine 10 is transmitted without intervention of the hydraulic oil.

The forward/reverse travel switching mechanism 30 switches a rotational direction of the rotary power from the torque converter 20 between a forward travel direction and a reverse travel direction or blocks the rotary power from the torque converter 20. The forward/reverse travel switching mechanism 30 includes a planetary gear train 31 of double-pinion type, for example, and traveling frictional engagement elements (a forward travel clutch (i.e., a clutch for forward travel) C1 and a reverse travel brake (i.e., a brake for reverse travel) B1, which may hereinafter be referred to as traveling frictional engagement elements C1, B1) that are engaged/disengaged by the hydraulic control of the hydraulic control circuit 70.

The planetary gear train 31 includes the sun gear 32, a ring gear 33, pinion gears 34, 35, and a carrier 36.

The sun gear 32 is connected to the turbine shaft 28 of the torque converter 20. The carrier 36 is connected to an input shaft 47 of the continuously variable transmission 40. The sun gear 32 and the carrier 36 are selectively connected to each other via the forward travel clutch C1. The ring gear 33 is selectively connected to a housing via the reverse travel brake B1. The pinion gear 34 in an inner side that meshes with the sun gear 32 and the pinion gear 35 in an outer side that meshes with the pinion gear 34 and the ring gear 33 are disposed between the sun gear 32 and the ring gear 33. Each of the pinion gears 34, 35 is held by the carrier 36 in a manner capable of freely rotating and revolving.

In the forward/reverse travel switching mechanism 30, when the forward travel clutch C1 is engaged and the reverse travel brake B1 is disengaged, the rotary power from the torque converter 20 is rotated in the forward travel direction and output to the input shaft 47 of the continuously variable transmission 40. On the other hand, when the forward travel clutch C1 is disengaged and the reverse travel brake B1 is engaged, the rotary power from the torque converter 20 is rotated in the reverse travel direction and output to the input shaft 47 of the continuously variable transmission 40. Furthermore, when both of the forward travel clutch C1 and the reverse travel brake B1 are disengaged, the rotary power from the torque converter 20 is blocked and is not thereby output to the continuously variable transmission 40.

The continuously variable transmission 40 continuously changes a speed ratio $\gamma$ (=input shaft rotational speed NIN/outputshaft rotational speed NOUT) of the rotary power from the forward/reverse travel switching mechanism 30. The continuously variable transmission 40 includes the input shaft 47 connected to the carrier 36 of the forward/reverse travel switching mechanism 30, an output shaft 48 connected to the reduction gear mechanism 50, a drive-side pulley (primary pulley) 41 connected to the input shaft 47, a driven-side pulley (secondary pulley) 42 connected to the output shaft 48, and a transmission belt 45 wound between the drive-side pulley 41 and the driven-side pulley 42. The drive-side pulley 41 and the driven-side pulley 42 are configured such that groove widths thereof can be controlled by the hydraulic control of the hydraulic control circuit 70.

In the continuously variable transmission 40, when the input shaft 47 is rotated by the rotary power from the forward/reverse travel switching mechanism 30, the rotation thereof further rotates the drive-side pulley 41. Then, the transmission belt 45 is circularly moved by the rotation of the drive-side pulley 41 to rotate the driven-side pulley 42, which in turn rotates the output shaft 48. In this way, the rotary power from the forward/reverse travel switching mechanism 30 is transmitted to the reduction gear mechanism 50 via the continuously variable transmission 40. At this time, the groove width of each of the drive-side pulley 41 and the driven-side pulley 42 is controlled by the hydraulic control of the hydraulic control circuit 70. A winding radius of the transmission belt 45 is continuously changed by the control of the groove width of the drive-side pulley 41 (speed change control), thereby changing the speed ratio $\gamma$ continuously. In addition, slippage of the transmission belt 45 is prevented by control of the groove width of the driven-side pulley 42 (belt clamping pressure control).

The reduction gear mechanism 50 decelerates the rotary power from the continuously variable transmission 40. The differential gear mechanism 60 distributes the rotary power from the reduction gear mechanism 50 to the left and right drive wheels 65L, 65R while offsetting a difference in turning angle between the left and right drive wheels 65L, 65R.

The hydraulic control circuit 70 hydraulically controls the lockup clutch 26 of the torque converter 20, the traveling frictional engagement elements C1, B1 of the forward/reverse travel switching mechanism 30, and the drive-side pulley 41 and the driven-side pulley 42 of the continuously variable transmission 40 according to the control by the electronic control unit 80.

For example, as shown in FIG. 3, the hydraulic control circuit 70 includes a speed change control valve 120, a belt clamping pressure control valve 130, a lockup control valve 140, a garage shift valve 160, a manual valve 170, a primary regulator valve 110, a pressure reducing valve 180, each of linear solenoid valves SLP, SLS, SLT, an ON-OFF solenoid valve SL1, and an oil pump 27.

The oil pump 27 is driven by the rotary power of the engine 10, for example, generates a line hydraulic pressure PL as a source pressure, and supplies the line pressure PL to the primary regulator valve 110, the speed change control valve 120, and the belt clamping pressure control valve 130 through an oil passage 101.

The primary regulator valve 110 regulates the line hydraulic pressure PL in the oil passage 101 to a specified hydraulic pressure according to output hydraulic pressure PSLS, PSLT respectively output from the solenoid valves SLS, SLT.

The primary regulator valve 110 includes, for example, a first spool 111a, a second spool 111b, a spring 112, control ports 115a, 115b, 115c, an input port 116, and an output port 117.

The first spool 111a and the second spool 111b are respectively disposed in an upper side and a lower side of the primary regulator valve 110 in a vertically movable manner. The spring 112 urges the second spool 111b upward. The control port 115a and the input port 116 are connected to the oil passage 101. The control port 115b is connected to an output port SLSb of the linear solenoid valve SLS through an oil passage 102. The control port 115c is connected to an output port 187 of the pressure reducing valve 180 through an oil passage 103. The output port 117 is connected to a secondary regulator valve (not shown).

The secondary regulator valve has a specified input port (not shown) and a specified output port (not shown). The specified input port is connected to an output port SLTc of the linear solenoid valve SLT and receives the output hydraulic pressure PSLT from the linear solenoid valve SLT. Meanwhile, the specified output port is connected to each of input ports 146a, 146b of the lockup control valve 140 and outputs an output hydraulic pressure PSEC of the secondary regulator valve to each of the input ports 146a, 146b. In the secondary regulator valve, the output hydraulic pressure PSEC that is output from the specified output port to each of the input ports 146a, 146b is controlled in accordance with the output hydraulic pressure PSLT input to the specified input port.

In the primary regulator valve 110, the line hydraulic pressure PL in the oil passage 101 is introduced from the control port 115a, the output hydraulic pressure PSLS of the linear solenoid valve SLS is introduced from the control port 115b, and an output hydraulic pressure PCTL of the pressure reducing valve 180 is introduced from the control port 115c. Then, the first spool 111a moves vertically according to a magnitude relationship between the line hydraulic pressure PL and a resultant force of an urging force of the spring 112 and higher one of the output hydraulic pressures PSLS, PCTL.

More specifically, when the line hydraulic pressure PL is larger than the resultant force, the first spool 111a moves downward, and the input port 116 and the output port 117 are thereby communicated with each other. Consequently, the line hydraulic pressure PL in the oil passage 101 is drained (discharged) through the input port 116 and the output port 117 and thus is reduced. On the contrary, when the resultant force is larger than the line hydraulic pressure PL, the first spool 111a moves upward, and the input port 116 and the output port 117 are thereby blocked from each other. Thus, the line hydraulic pressure PL in the oil passage 101 is maintained. If the output hydraulic pressure PSLS is higher than the output hydraulic pressure PCTL in this circumstance, the first spool 111a moves upward while being separated from the second spool 111b. On the contrary, if the output hydraulic pressure PCTL is higher than the output hydraulic pressure PSLS, the first spool 111a moves upward integrally with the second spool 111b.

The speed change control valve 120 uses an output hydraulic pressure (controlled hydraulic pressure) PSLPb of the linear solenoid valve SLP as a pilot pressure to regulate the line hydraulic pressure PL, which is supplied from the oil pump 27 through the oil passage 101, supplies a regulated line hydraulic pressure (hereinafter referred to as a speed change hydraulic pressure) PIN as the hydraulic oil pressure to a hydraulic actuator 413 of the continuously variable transmission 40 through an oil passage 109a, and controls the groove width of the drive-side pulley 41 in the continuously variable transmission 40.

The belt clamping pressure control valve 130 uses the output hydraulic pressure (controller hydraulic pressure) PSLS of the linear solenoid valve SLS as the pilot pressure to regulate the line hydraulic pressure PL, which is supplied from the oil pump 27 through the oil passage 101, supplies a regulated line hydraulic pressure (hereinafter referred to as a belt clamping hydraulic pressure) POUT as the hydraulic oil pressure to a hydraulic actuator 423 of the continuously variable transmission 40 through an oil passage 109b, and controls the groove width of the driven-side pulley 42 in the continuously variable transmission 40.

The pressure reducing valve 180 reduces the output hydraulic pressure PSLT of the linear solenoid valve SLT and supplies it to the control port 115c of the primary regulator valve 110. The pressure reducing valve 180 includes, for example, a spool 181, a spring 182, a control port 185, an input port 186, the output port 187, a feedback port 188, and a drain port 189.

The spool 181 is disposed in the pressure reducing valve 180 in the vertically movable manner. The spring 182 urges the spool 181 upward. The control port 185 is connected to output port SLTb of the linear solenoid valve SLT through an oil passage 104. The input port 186 is connected to a first modulator valve (not shown). The first modulator valve regulates the line hydraulic pressure PL and outputs it as an output hydraulic pressure (first modulator pressure) PM1 to the input port 186. The output port 187 is connected to the control port 115c of the primary regulator valve 110 through the oil passage 103. The feedback port 188 is connected to the output port 187 through the oil passage 103.

In the pressure reducing valve 180, the output hydraulic pressure (controlled hydraulic pressure) PSLT of the linear solenoid valve SLT is introduced to the control port 185, the output hydraulic pressure PM1 of the first modulator valve is introduced to the input port 186, and the output hydraulic pressure PCTL of the output port 187 is introduced to the feedback port 188. Then, the spool 181 moves vertically according to a magnitude relationship between the output hydraulic pressure PSLT and a resultant force of the output hydraulic pressure PCTL and a pressure P182 of an urging force of the spring 182.

More specifically, when the output hydraulic pressure PSLT is lower than the pressure P182 of the urging force of the spring 182, the spool 181 moves upward to communicate between the output port 187 and the drain port 189 and to block the input port 186. Consequently, the output hydraulic pressure PCTL of the output port 187 is drained (discharged) from the drain port 189 and becomes zero.

When the output hydraulic pressure PCTL of the pressure reducing valve 180 is zero, the primary regulator valve 110 cannot hydraulically be controlled by the output hydraulic pressure PCTL. However, because the output hydraulic pressure PSLS of the linear solenoid valve SLS is supplied to the control port 115$b$ of the primary regulator valve 110 through the oil passage 102, the primary regulator valve 110 is hydraulically controlled.

On the contrary, when the output hydraulic pressure PSLT is equal to the pressure P182 of the urging force of the spring 182 or higher, the spool 181 moves downward to communicate between the output port 187 and the input port 186 and to block the drain port 189. The output hydraulic pressure PCTL in this case satisfies PCTL=PSLT−P182 from a balanced relationship between the resultant force and the output hydraulic pressure PSLT. Just as described, the pressure reducing valve 180 reduces the output hydraulic pressure PSLT of the linear solenoid valve SLT to (PSLT−P182) and supplies (PSLT−P182) as the output hydraulic pressure PCTL to the control port 115$c$ of the primary regulator valve 110.

The manual valve 170 uses an output hydraulic pressure (hydraulic pressure) P160 of the garage shift valve 160 as the hydraulic oil pressure to hydraulically control the forward travel clutch C1 and the reverse travel brake B1 of the forward/reverse travel switching mechanism 30 according to an operating position of a shift lever 171.

The shift lever 171 switches between engagement and disengagement of the forward travel clutch C1 and the reverse travel brake B1. For example, a parking position "P" for parking, a reverse position "R" for reverse traveling, a neutral position "N" where power transmission is blocked, a drive position "D" for forward traveling, and the like are set as the operating positions of the shift lever 171.

When the operating position of the shift lever 171 is switched to either the parking position "P" or the neutral position "N", the manual valve 170 does not supply the output hydraulic pressure P160 to the forward travel clutch C1 and the reverse travel brake B1 but drains (discharges) the hydraulic oil in the forward travel clutch C1 and the reverse travel brake B1. This leads to the disengagement of the forward travel clutch C1 and the reverse travel brake B1.

Meanwhile, when the operating position of the shift lever 171 is switched to the reverse position "R", the manual valve 170 does not supply the output hydraulic pressure P160 to the forward travel clutch C1 while supplying the output hydraulic pressure P160 to the reverse travel brake B1, and drains the hydraulic oil in the forward travel clutch C1. This leads to the engagement of the reverse travel brake B1 and the disengagement of the forward travel clutch C1.

Furthermore, when the operating position of the shift lever 171 is switched to the drive position "D"; the manual valve 170 does not supply the output hydraulic pressure P160 to the reverse travel brake B1 while supplying it to the forward travel clutch C1, and drains the hydraulic oil in the reverse travel brake B1. This leads to the engagement of the forward travel clutch C1 and disengagement of the reverse travel brake B1.

Based on an output hydraulic pressure (controlled hydraulic pressure) PSL1 of the ON-OFF solenoid valve SL1, the garage shift valve 160 selects one of the output hydraulic pressure (controlled hydraulic pressure) PSLT of the linear solenoid valve SLT and an output hydraulic pressure PM2 of a second modulator valve (not shown) and outputs it as the output hydraulic pressure (hydraulic pressure) P160 to the manual valve 170.

The garage shift valve 160 includes a spool 161, a spring 162, a control port 165, input ports 166$a$, 166$b$, an output port 167, and a drain port 169.

The spool 161 is disposed in the garage shift valve 160 in the vertically movable manner. The spring 162 urges the spool 161 upward. The control port 165 is connected to an output port SL1$b$ of the ON-OFF solenoid valve SL1. The input port 166$a$ is connected to the second modulator valve. The second modulator valve regulates the line hydraulic pressure PL and outputs it as the output hydraulic pressure PM2 to the input port 166$a$. The input port 166$b$ is connected to the output port SLTc of the linear solenoid valve SLT through an oil passage 105. The output port 167 is connected to the specified input port of the manual valve 170 through an oil passage 107.

In the garage shift valve 160, when the ON-OFF solenoid valve SL1 is controlled to be ON (energizing control) and the output hydraulic pressure PSL1 of the ON-OFF solenoid valve SL1 is then introduced to the control port 165, the spool 161 moves downward against the urging force of the spring 162, and the garage shift valve 160 is in turn held in a control position (a position on a left half of the garage shift valve 160 in FIG. 2).

In the control position, while the input port 166$b$ is communicated with the output port 167, the input port 166$a$ is blocked from the output port 167. Accordingly, the output hydraulic pressure PSLT of the linear solenoid valve SLT is output as the output hydraulic pressure (hydraulic oil pressure) P160 via the input port 166$b$ and the output port 167, and is supplied to the manual valve 170 through the oil passage 107. As described above, the manual valve 170 uses the output hydraulic pressure P160 to engage either the forward travel clutch C1 or the reverse travel brake B1 according to the operating position of the shift lever 171 (that is, the forward travel clutch C1 or the reverse travel brake B1 directly receives the output hydraulic pressure PSLT of the linear solenoid valve SLT). For example, in a garage mode, the forward travel clutch C1 directly receives the output hydraulic pressure PSLT of the linear solenoid valve SLT.

On the other hand, when the ON-OFF solenoid valve SL1 is controlled to be OFF (non-energizing control) and the introduction of the output hydraulic pressure PSL1 is then terminated, the spool 161 moves upward by the urging force of the spring 162, and the garage shift valve 160 is held in a normal position (a position on a right half of the garage shift valve 160 in FIG. 2).

In the normal position, while the input port 166$a$ is communicated with the output port 167, the input port 166$b$ is blocked from the output port 167. Accordingly, the output hydraulic pressure PM2 of the second modulator valve is output as the output hydraulic pressure P160 via the input port 166$a$ and the output port 167, and is then supplied to the manual valve 170 through the oil passage 107. As described above, the manual valve 170 uses the output hydraulic pressure P160 to engage either the forward travel clutch C1 or the reverse travel brake B1 according to the operating position of the shift lever 171.

For example, when the operating position of the shift lever 171 is switched from a non-travel position ("P" or "N", for example) to a travel position ("D", for example) in a garage shift such as at a start of the vehicle, or when the operating position of the shift lever 171 is switched to the reverse position "R", the ON-OFF solenoid valve SL1 is first controlled to be ON and then controlled to be OFF by the control of the electronic control unit 80.

In other words, in a transition of the engagement between the traveling frictional engagement elements C1, B1 (that is, a period from a start of the engagement to the complete engagement), the ON-OFF solenoid valve SL1 is controlled to be ON, outputs the output hydraulic pressure PSLT of the linear solenoid valve SLT as the output hydraulic control (hydraulic control) P160 in the transition of the engagement, is then controlled to be OFF when the traveling frictional engagement elements C1, B1 are completely engaged with each other, and finally outputs the output hydraulic pressure PM2 of the second modulator valve as the output hydraulic pressure (hydraulic pressure) P160 for the complete engagement.

When the operating position of the shift lever 171 is the non-travel position ("P" or "N", for example), the ON-OFF solenoid valve SL1 is controlled to be OFF. Because the manual valve 170 does not supply the output hydraulic pressure P160 to the traveling frictional engagement elements C1, B1 in this case, the output hydraulic pressure PM2 of the second modulator valve is not supplied to the traveling frictional engagement elements C1, B1.

The lockup control valve 140 hydraulically controls engagement and disengagement of the lockup clutch 26 of the torque converter 20 according to the output hydraulic pressure PSLT of the linear solenoid valve SLT and the output hydraulic pressure PSL1 of the ON-OFF solenoid valve SL1.

The lockup control valve 140 includes a spool 141, a spring 142, a control port 145a, a backup port 145b, input ports 146a, 146b, a disengagement-side port 147a, an engagement-side port 147b, a feedback port 148, and drain ports 149a, 149b.

The spool 141 is disposed in the lockup control valve 140 in the vertically movable manner. The spring 142 urges the spool 141 upward. The control port 145a is connected to the output port SLTc of the linear solenoid valve SLT through the oil passage 105. The backup port 145b is connected to the output port SL1b of the ON-OFF solenoid valve SL1 through an oil passage 108. The input ports 146a, 146b are connected to the secondary regulator valve, which is connected to the output port 117 of the primary regulator valve 110. The disengagement-side port 147a is connected to the disengagement-side hydraulic chamber 262 of the lockup clutch 26 through an oil passage 106a. The engagement-side port 147b and the feedback port 148 are connected to the engagement-side hydraulic chamber 261 of the lockup clutch 26 through an oil passage 106b.

In the lockup control valve 140, when the output hydraulic pressure PSLT of the linear solenoid valve SLT is introduced to the control port 145a while the ON-OFF solenoid valve SL1 is OFF, the spool 141 moves downward. At this time, if the output hydraulic pressure PSLT is equal to a specified hydraulic pressure PSLTc or higher, the lockup control valve 140 is held in an ON position (a position on a right half of the lockup control valve 140 in FIG. 3).

In the ON position, the input port 146b is communicated with the engagement-side port 147b, and the disengagement-side port 147a is communicated with the drain port 149a. Accordingly, the output hydraulic pressure PSEC of the secondary regulator valve is supplied as the hydraulic oil pressure to the engagement-side hydraulic chamber 261 of the lockup clutch 26 via the input port 146b, the engagement-side port 147b, and the oil passage 106b in this order. In other words, the torque converter 20 receives the output hydraulic pressure PSEC. Consequently, the lockup engagement hydraulic pressure PON of the engagement-side hydraulic chamber 261 becomes equal to the output hydraulic pressure PSEC. At this time, the output hydraulic pressure (=PON=PSEC) of the engagement-side port 147b is introduced to the feedback port 148 through the oil passage 106b. In addition, the lockup disengagement hydraulic pressure POUT of the disengagement-side hydraulic chamber 262 is drained (discharged) via the oil passage 106a, the disengagement-side port 147a, and the drain port 149a in this order. Accordingly, the lockup disengagement hydraulic pressure POUT becomes zero.

In the ON position, a force for pressing the spool 141 downward (the output hydraulic pressure PSLT) is balanced with a resultant force of forces for pressing the spool 141 upward (the pressure P142 of the urging force of the spring 142 and the introduced hydraulic pressure (=PON) to the feedback port 148). Thus, the lockup differential pressure $\Delta P$ (=PON−POFF) is expressed as $\Delta P$=PSLT−P142. Consequently, the control of the lockup differential pressure $\Delta P$ (that is, the engagement/disengagement control of the lockup clutch 26) can be executed by controlling the output hydraulic pressure PSLT.

More specifically, if the output hydraulic pressure PSLT is increased within a range that the ON position can be held, the lockup differential pressure $\Delta P$ is increased, and a degree of engagement of the lockup clutch 26 is thereby increased. On the other hand, if the output hydraulic pressure PSLT is reduced, the lockup differential pressure $\Delta P$ is also reduced, and the degree of engagement of the lockup clutch 26 is thereby reduced.

In a case where the ON-OFF solenoid valve SL1 is OFF and where the output hydraulic pressure PSLT of the linear solenoid valve SLT is lower than the specified hydraulic pressure PSLTc (including a state that the output hydraulic pressure PSLT is stopped) (a first case), or where the ON-OFF solenoid valve SL1 is ON and thus the output hydraulic pressure PSL1 of the ON-OFF solenoid valve SL1 is introduced to the backup port 145b (a second case), the spool 141 moves upward, and the lockup control valve 140 is held in an OFF position (a position on a left half of the lockup control valve 140 in FIG. 3).

In the OFF position, the input port 146a is communicated with the disengagement-side port 147a, and the engagement-side port 147b is communicated with the drain port 149b. Accordingly, the output hydraulic pressure PSEC of the secondary regulator valve is supplied to the disengagement-side hydraulic chamber 262 of the lockup clutch 26 via the input port 146a, the disengagement-side port 147a, and the oil passage 106a in this order. Meanwhile, the lockup engagement hydraulic pressure PON of the engagement-side hydraulic chamber 261 is discharged via the oil passage 106b, the engagement-side port 147b, and the drain port 149b in this order. Consequently, the lockup differential pressure $\Delta P$ (=PON−POUT) becomes a negative value, and the lockup clutch 26 is disengaged.

Particularly in the second case, due to the output hydraulic pressure PSL1 of the ON-OFF solenoid valve SL1, the lockup differential pressure $\Delta P$ forcibly becomes a negative value regardless of the ON/OFF state of the linear solenoid valve SLT, and the lockup clutch 26 is thus disengaged. In other words, when the garage shift valve 160 is held in the control position while the ON-OFF solenoid valve SL1 is ON, and when the transition of the engagement of the traveling frictional engagement elements C1, B1 is controlled, the lockup clutch 26 is forcibly disengaged.

Here, the lockup differential pressure ΔP is increased/reduced according to an increase/reduction of the output hydraulic pressure PSLT. At this time, along with the increase/reduction of the lockup differential pressure ΔP, the hydraulic oil amount in the torque converter 20 (that is, an amount of the hydraulic oil in the engagement-side hydraulic chamber 261) is also increased/reduced. Thus, when the output hydraulic pressure PSLT is controlled, the hydraulic oil amount in the torque converter 20 is also controlled.

The ON-OFF solenoid valve SL1 is a control valve for controlling the garage shift valve 160 according to an excitation current supplied from the electronic control unit 80, and is configured as an electromagnetic valve of normal close type, for example.

The ON-OFF solenoid valve SL1 includes an input port SL1$a$ and the output port SL1$b$. The input port SL1$a$ is connected to the first modulator valve. The output port SL1$b$ is connected to the control port 165 of the garage shift valve 160.

When the excitation current is supplied, the ON-OFF solenoid valve SL1 outputs the output hydraulic pressure (first modulator pressure) PM1 of the first modulator valve, which is introduced from the input port SL1$a$, as the output hydraulic pressure (controlled hydraulic pressure) PSL1 from the output port SL1$b$. On the other hand, when the excitation current is not supplied, the ON-OFF solenoid valve SL1 stops outputting the output hydraulic pressure PSL1 from the output port SL1$b$. As described above, the garage shift valve 160 is controlled be in the control position/the normal position by the output/stop of the output hydraulic pressure PSL1.

The linear solenoid valve SLT is a control valve for executing regulation control of the line hydraulic pressure PL, engagement/disengagement control of the lockup clutch 26, and engagement transition control of the traveling frictional engagement elements C1, B1 according to the excitation current supplied from the electronic control unit 80, and is configured as the electromagnetic valve of normal open type, for example.

The linear solenoid valve SLT includes an input port SLTa and the output ports SLTb, SLTc. The input port SLTa is connected to the second modulator valve. The output port SLTb is connected to the control port 185 of the pressure reducing valve 180 through the oil passage 104. The output port SLTc is connected to the control port 145$a$ of the lockup control valve 140, the input port 166$b$ of the garage shift valve 160, and the specified input port of the secondary regulator valve through the oil passage 105.

When the excitation current is not supplied, the linear solenoid valve SLT outputs the output hydraulic pressure (second modulator hydraulic pressure) PM2 of the second modulator valve introduced from the input port SLTa as the output hydraulic pressure (controlled hydraulic pressure) PSLT from each of the output ports SLTb, SLTc. On the other hand, when the excitation current is supplied, the linear solenoid valve SLT regulates the output hydraulic pressure PM2 of the second modulator valve, which is introduced from the input port SLTa, according to the excitation current, and outputs the output hydraulic pressure PM2 as the output hydraulic pressure (controlled hydraulic pressure) PSLT from each of the output ports SLTb, SLTc.

The output hydraulic pressure PSLT of the output port SLTb is supplied to the control port 185 of the pressure reducing valve 180 through the oil passage 104. The regulation control of the line hydraulic pressure PL is not executed on the basis of the above output hydraulic pressure PSLT but on the basis of the output hydraulic pressure PCTL, which is obtained when the output hydraulic pressure PSLT is reduced by the pressure reducing valve 180, as described above. Meanwhile, the output hydraulic pressure PSLT of the output port SLTc is supplied to the control port 145$a$ of the lockup control valve 140 and the input port 166$b$ of the garage shift valve 160 through the oil passage 105. As described above, the engagement/disengagement control of the lockup clutch 26 and the engagement transition control of the traveling frictional engagement elements C1, B1 are executed on the basis of the output hydraulic pressure PSLT just as described.

The linear solenoid valve SLP is a control valve for executing the regulation control of the speed change hydraulic pressure PIN of the continuously variable transmission 40 according to the excitation current, which is supplied from the electronic control unit 80, and is configured as an electromagnetic valve of the normal close type, for example.

The linear solenoid valve SLP includes an input port SLPa and an output port SLPb. The input port SLPa is connected to the second modulator valve. The output port SLPb is connected to the speed change control valve 120.

When the excitation current is not supplied, the linear solenoid valve SLP outputs the output hydraulic pressure PM2 of the second modulator valve, which is introduced from the input port SLPa, as an output hydraulic pressure PSLP from the output port SLPb. On the other hand, when the excitation current is supplied, the linear solenoid valve SLP regulates the output hydraulic pressure PM2 of the second modulator valve, which is introduced from the input port SLPa, according to the excitation current and outputs the output hydraulic pressure PM2 as the output hydraulic pressure PSLP from the output port SLPb. As described above, the regulation control of the speed change hydraulic pressure PIN of the continuously variable transmission 40 is executed on the basis of the output hydraulic pressure PSLP.

The linear solenoid valve SLS is a control valve for executing the regulation control of the line hydraulic pressure PL and the regulation control of the belt clamping hydraulic pressure POUT of the continuously variable transmission 40 according to the excitation current supplied from the electronic control unit 80, and is configured as the electromagnetic valve of the normal close type, for example.

The linear solenoid valve SLS includes an input port SLSa and the output port SLSb. The input port SLSa is connected to the second modulator valve. The output port SLSb is connected to the control port 115$b$ of the primary regulator valve 110 and the belt clamping pressure control valve 130.

When the excitation current is not supplied, the linear solenoid valve SLS outputs the output hydraulic pressure PM2 of the second modulator valve, which is introduced from the input port SLSa, as the output hydraulic pressure PSLS from the output port SLSb. On the other hand, when the excitation current is supplied, the linear solenoid valve SLS regulates the output hydraulic pressure PM2 of the second modulator valve, which is introduced from the input port SLSa, according to the excitation current, and outputs the output hydraulic pressure PM2 as the output hydraulic pressure PSLS from the output port SLSb. As described above, the line hydraulic pressure PL and the belt clamping hydraulic pressure POUT of the continuously variable transmission 40 are regulated on the basis of the output hydraulic pressure PSLS.

As shown in FIG. 2, the electronic control unit 80 is connected to various in-vehicle sensors such as a lever position sensor 81, an accelerator pedal operation amount sensor 82, an engine speed sensor 83, an output shaft rotational speed sensor 84, an input shaft rotational speed sensor 85, and a turbine rotational speed sensor 86, for example.

The lever position sensor 81 detects an operating position PSH of the shift lever 171. The accelerator pedal operation amount sensor 82 detects an operation amount θACC of an accelerator pedal. The engine speed sensor 83 detects a speed NE of the engine 10 (a rotational speed of the output shaft 11). The output shaft rotational speed sensor 84 detects a rotational speed NOUT of the output shaft 48 (an output shaft rotational speed) of the continuously variable transmission 40. The input shaft rotational speed sensor 85 detects a rotational speed NIN of the input shaft 47 (an input shaft rotational speed) of the continuously variable transmission 40. The turbine rotational speed sensor 86 detects a rotational speed (turbine rotational speed) NT of the turbine shaft 28 of the torque converter 20. In addition, the electronic control unit 80 is connected to an ignition switch IG for starting the engine 10.

Based on the detection values PSH, θACC, NE, NOUT, NIN, NT of the various in-vehicle sensors 81 to 86, the electronic control unit 80 controls the excitation current supplied to each of the solenoid valves SLP, SLS, SLT, SL1 of the hydraulic control circuit 70 so as to control the output hydraulic pressures PSLP, PSLS, PSLT, PSL1 of the solenoid valves SLP, SLS, SLT, SL1, respectively. Accordingly, it is configured to execute the regulation control of the speed change hydraulic pressure PIN and the belt clamping hydraulic pressure POUT of the continuously variable transmission 40, the engagement/disengagement control of the traveling frictional engagement elements C1, B1 of the forward/reverse travel switching mechanism 30, the engagement/disengagement control of the lockup clutch 26, the control of the hydraulic oil amount in the torque converter 20, and the regulation control of the line hydraulic pressure PL.

A well-known controlling method is applied to the control of the output hydraulic pressures PSLP, PSLS, PSL1 of the solenoid valves SLP, SLS, SL1, respectively, and thus a detailed description thereon will not be made. A detailed description will be made below on the control of the output hydraulic pressure PSLT of the linear solenoid valve SLT.

The electronic control unit 80 controls the output hydraulic pressure PSLT of the linear solenoid valve SLT so as to control the engagement/disengagement of the traveling frictional engagement elements C1, B1 and the hydraulic oil amount in the torque converter 20. More specifically, depending on whether the hydraulic oil amount in the torque converter 20 is insufficient, the electronic control unit 80 controls the output hydraulic pressure (controlled hydraulic pressure) PSLT of the linear solenoid valve SLT either to be a minimum hydraulic pressure PSLTa that is required for the engagement of the traveling frictional engagement elements C1, B1 or to be a specified hydraulic pressure PSLTb that is higher than the minimum hydraulic pressure PSLTa.

When the output hydraulic pressure PSLT is controlled to be the minimum hydraulic pressure PSLTa, the hydraulic oil amount Q in the torque converter 20 (that is, the hydraulic oil amount in the engagement-side hydraulic chamber 261) is controlled to be an oil amount Qa that is at least equal to a minimum oil amount Qmin with which the favorable power transmission can be achieved between the pump impeller 22 and the turbine runner 23 via the hydraulic oil. Meanwhile, the specified hydraulic pressure PSLTb corresponds to the output hydraulic pressure PSLT at which the hydraulic oil amount Q in the torque converter 20 is rapidly filled, for example.

The electronic control unit 80 includes an engine start detection section 87 for detecting an engine start, a determination section 88 for determining whether the hydraulic oil amount Q in the torque converter 20 is insufficient at the engine start, and a control section 89 for controlling the output hydraulic pressure PSLT of the linear solenoid valve SLT based on a determination result of the determination section 88.

The engine start detection section 87 detects the start of the engine 10 according to the presence or absence of an ON signal that is output from the ignition switch IG when the ignition switch IG is turned ON.

The determination section 88 determines whether the hydraulic oil amount Q in the torque converter 20 is insufficient on the basis of differential rotation $\Delta N$ (=NE−NT) between the engine speed NE and the turbine rotational speed NT at the engine start (that is, when the engine start detection section 87 detects the engine start), for example. More specifically, the determination section 88 determines that the hydraulic oil amount Q in the torque converter 20 is insufficient when the differential rotation $\Delta N$ is specified threshold differential rotation $\Delta N1$ or larger, and determines that the hydraulic oil amount Q in the torque converter 20 is sufficient when the differential rotation $\Delta N$ is below the specified threshold differential rotation $\Delta N1$.

This determination is made in consideration of a fact that, when the hydraulic oil amount Q in the torque converter 20 is insufficient, the power transmission efficiency between the pump impeller 22 and the turbine runner 23 via the hydraulic oil is degraded (that is, the differential rotation $\Delta N$ is increased).

Here, the determination section 88 makes the determination at the engine start; however, the determination may be made immediately after the engine start.

When the determination section 88 determines that the hydraulic oil amount Q in the torque converter 20 is sufficient, the control section 89 controls the excitation current to be supplied to the linear solenoid valve SLT such that the output hydraulic pressure PSLT of the linear solenoid valve SLT becomes the minimum hydraulic pressure PSLTa.

Accordingly, the output hydraulic pressure PSLT of the linear solenoid valve SLT is controlled by the minimum hydraulic pressure PSLTa, and the minimum hydraulic pressure PSLTa is introduced to the input port 166b of the garage shift valve 160 and the control port 145a of the lockup control valve 140.

Consequently, the output hydraulic pressure P160 at the time when the garage shift valve 160 is in the control position is controlled to be the minimum hydraulic pressure PSLTa, and the hydraulic oil pressure (clutch pressure) in the transition of engagement of the traveling frictional engagement elements C1, B1 is controlled to be the minimum hydraulic pressure PSLTa. This reduces a shock upon the engagement of the traveling frictional engagement elements C1, B1.

Meanwhile, in the lockup control valve 140, the lockup differential pressure $\Delta P$ is controlled to be lockup differential pressure $\Delta Pa$ that corresponds to the minimum hydraulic pressure PSLTa. Accordingly, the hydraulic oil amount Q in the torque converter 20 is controlled to be the hydraulic oil amount Qa ($\geq$Qmin) that corresponds to the minimum hydraulic pressure PSLTa, and thus the favorable power transmission between the pump impeller 22 and the turbine runner 23 via the hydraulic oil can be achieved.

In addition, when the determination section 88 determines that the hydraulic oil amount Q in the torque converter 20 is insufficient, the control section 89 controls the excitation current to be supplied to the linear solenoid valve SLT such that the output hydraulic pressure PSLT of the linear solenoid valve SLT becomes the specified hydraulic pressure PSLTb.

Accordingly, the output hydraulic pressure PSLT of the linear solenoid valve SLT is controlled to be the specified hydraulic pressure PSLTb, and the specified hydraulic pressure PSLTb is introduced to the input port 166*b* of the garage shift valve 160 and the control port 145*a* of the lockup control valve 140.

Consequently, in the lockup control valve 140, the lockup differential pressure ΔP is rapidly increased to a lockup differential pressure ΔPb that corresponds to the specified hydraulic pressure PSLTb. Thus, the hydraulic oil amount Q in the torque converter 20 is rapidly filled to be a hybrid oil amount Qb that corresponds to the specified hydraulic pressure PSLTb. Here, the hydraulic oil amount Qb is an oil amount at least equal to the hydraulic oil amount (Qmin, for example) for cancelling insufficiency of the hydraulic oil amount Q in the torque converter 20. Meanwhile, in the garage shift valve 160, the output hydraulic pressure P160 at the time when the garage shift valve 160 is in the control position is increased to the specified hydraulic pressure PSLTb, and the hydraulic oil pressure in the transition of engagement of the traveling frictional engagement elements C1, B1 is controlled to be the specified hydraulic pressure PSLTb.

If the determination section 88 determines that the hydraulic oil amount Q in the torque converter 20 is sufficient during rapid filling, the control section 89 controls the excitation current to be supplied to the linear solenoid valve SLT such that the output hydraulic pressure PSLT of the linear solenoid valve SLT becomes the minimum hydraulic pressure PSLTa.

<Description of Operation>

Figure 4:
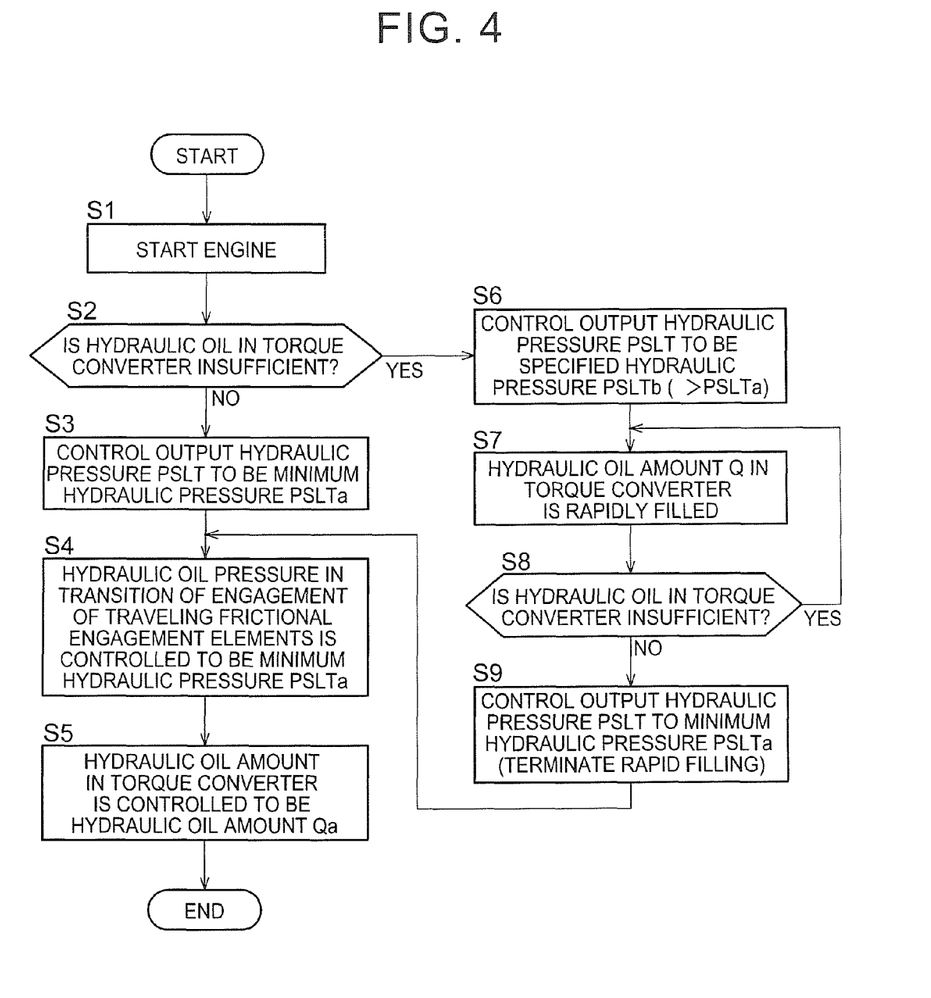
FIG. 4 is a flowchart for describing operations of main components of the hydraulic control device according to the first embodiment of the present invention.

Next, a description will be made on operations of the main components of the hydraulic control device 1 on the basis of FIG. 4. FIG. 4 is a flowchart for describing the operations of the main components of the hydraulic control device according to the first embodiment.

In a step S1, the electronic control unit 80 detects the start of the engine 10 when the engine start detection section 87 obtains the ON signal from the ignition switch 1G. Then a process proceeds to a step S2.

In the step S2, the electronic control unit 80 obtains the engine speed NE from the engine speed sensor 83 and also obtains the turbine rotational speed NT from the turbine rotational speed sensor 86. Then, based on the differential rotation ΔN between the engine speed NE and the turbine rotational speed NT, the electronic control unit 80 uses the determination section 88 to determine whether the hydraulic oil amount Q in the torque converter 20 is insufficient. If the determination section 88 determines here that the hydraulic oil amount Q in the torque converter 20 is sufficient (No), the process proceeds to a step S3. On the contrary, if the determination section 88 determines here that the hydraulic oil amount Q in the torque converter 20 is insufficient (Yes), the process proceeds to a step S6.

In the step S3, the electronic control unit 80 uses the control section 89 to control the excitation current to be supplied to the linear solenoid valve SLT such that the output hydraulic pressure PSLT of the linear solenoid valve SLT becomes the minimum hydraulic pressure PSLTa. Accordingly, the output hydraulic pressure PSLT is controlled to be the minimum hydraulic pressure PSLTa. Then, the process proceeds to a step S4.

In the step S4, because the output hydraulic pressure PSLT has been controlled to be the minimum hydraulic pressure PSLTa, in the garage shift valve 160, the output hydraulic pressure P160 at the time when the garage shift valve 160 is in the control position is controlled to be the minimum hydraulic pressure PSLTa, and the hydraulic oil pressure in the transition of engagement of the traveling frictional engagement elements C1, B1 is controlled to be the minimum hydraulic pressure PSLTa. Accordingly, the shock upon the engagement of the traveling frictional engagement elements C1, B1 is reduced.

In a step S5, because the output hydraulic pressure PSLT has been controlled to be the minimum hydraulic pressure PSLTa, in the lockup control valve 140, the lockup differential pressure ΔP is controlled to be the lockup differential pressure ΔPa that corresponds to the minimum hydraulic pressure PSLTa. Accordingly, the hydraulic oil amount Q in the torque converter 20 is controlled to be the hydraulic oil amount Qa that corresponds to the minimum hydraulic pressure PSLTa, and the favorable power transmission can thereby be achieved between the pump impeller 22 and the turbine runner 23 via the hydraulic oil. Then, the process is terminated.

Meanwhile, in the step S6, the control section 89 controls the excitation current to be supplied to the linear solenoid valve SLT such that the output hydraulic pressure PSLT of the linear solenoid valve SLT becomes the specified hydraulic pressure PSLTb. Accordingly, the output hydraulic pressure PSLT is controlled to be the specified hydraulic pressure PSLTb. Then, the process proceeds to a step S7.

In the step S7, because the output hydraulic pressure PSLT has been controlled to be the specified hydraulic pressure PSLTb, in the lockup control valve 140, the lockup differential pressure ΔP is rapidly increased to the lockup differential pressure ΔPb that corresponds to the specified hydraulic pressure PSLTb. Accordingly, the hydraulic oil amount Q in the torque converter 20 is rapidly filled to be the hydraulic oil amount Qb that corresponds to the specified hydraulic pressure PSLTb.

Meanwhile, because the output hydraulic pressure PSLT has been controlled to be the specified hydraulic pressure PSLTb, in the garage shift valve 160, the output hydraulic pressure P160 at the time when the garage shift valve 160 is in the output hydraulic pressure P160 is increased to the specified hydraulic pressure PSLTb, and the hydraulic pressure during the transition of engagement the traveling frictional engagement elements C1, B1 is controlled to be the specified hydraulic pressure PSLTb. Then, the process proceeds to a step S8.

In the step S8, as in the step S2, the electronic control unit 80 uses the determination section 88 to determine whether the hydraulic oil amount Q in the torque converter 20 is insufficient on the basis of the differential rotation ΔN between the engine speed NE and the turbine rotational speed NT. If the determination section 88 determines here that the hydraulic oil amount Q in the torque converter 20 is sufficient (No), the process proceeds to a step S9. On the contrary, if the determination section 88 determines here that the hydraulic oil amount Q in the torque converter 20 is insufficient (Yes), the process returns to the step S7.

In the step S9, the electronic control unit 80 uses the control section 89 to control the excitation current to be supplied to the linear solenoid valve SLT such that the output hydraulic pressure PSLT of the linear solenoid valve SLT becomes the specified hydraulic pressure PSLTa. Accordingly, the output hydraulic pressure PSLT is controlled to be the specified hydraulic pressure PSLTa. Consequently, the rapid filling of the hydraulic oil amount Q in the torque converter 20 in the step S7 is terminated. Then, the process proceeds to the step S4.

<Primary Effects>

As it has been described so far, according to this embodiment, the linear solenoid valve (control valve) SLT controls the hydraulic oil amount Q in the torque converter 20 and the hydraulic oil pressure of each of the traveling frictional engagement elements C1, B1 in the forward/reverse travel switching mechanism 30 on the basis of the same (single) controlled hydraulic pressure PSLT. Compared to a case where the hydraulic oil amount Q in the torque converter 20 is sufficient, when the hydraulic oil amount Q in the torque converter 20 is insufficient at the start of the engine 10 or immediately after the start, the controlled hydraulic pressure PSLT is increased. Accordingly, when the hydraulic oil amount Q in the torque converter 20 is insufficient at the start or immediately after the start of the engine 10, the hydraulic oil amount Q in the torque converter 20 can rapidly be filled, and thus failure in torque transmission can be suppressed. Furthermore, when the hydraulic oil amount Q in the torque converter 20 is sufficient at the start or immediately after the start of the engine 10, the controlled hydraulic pressure PSLT can be controlled to be low (that is, the controlled hydraulic pressure PSLT can be controlled to be low during the normal operation), and it is thereby possible to suppress the shock of clutch engagement and the consumed amount of the hydraulic oil.

In addition, when the hydraulic oil amount Q in the torque converter 20 is sufficient, the controlled hydraulic pressure PSLT is controlled to be the minimum hydraulic pressure PSLTa that is required for the engagement of the traveling frictional engagement elements C1, B1. Thus, it is possible to further suppress the shock of clutch engagement and the consumed amount of the hydraulic oil. On the other hand, when the hydraulic oil amount Q in the torque converter 20 is insufficient, the controlled hydraulic pressure PSLT is controlled to be the hydraulic pressure PSLTb that is higher than the minimum hydraulic pressure PSLTa. Therefore, it is possible to rapidly fill the hydraulic oil amount Q in the torque converter 20 and thus is possible to suppress the failure in torque transmission.

Moreover, when the differential rotation ΔN between the engine speed NE of the engine 10 and the turbine rotational speed NT of the torque converter 20 is equal to the specified threshold differential rotation ΔN1 or larger, it is determined that the hydraulic oil amount Q in the torque converter 20 is insufficient. Thus, it is possible by using the differential rotation ΔN between the engine speed NE of the engine 10 and the turbine rotational speed NT of the torque converter 20 to determine whether the hydraulic oil amount Q in the torque converter 20 is insufficient.

Second Embodiment

In the first embodiment, it is determined whether the hydraulic oil amount Q in the torque converter 20 is insufficient on the basis of the differential rotation ΔN between the engine speed NE of the engine 10 and the turbine rotational speed NT of the torque converter 20. However, in this embodiment, it is determined whether the hydraulic oil amount Q in the torque converter 20 is insufficient on the basis of a temperature T of lubricating oil in the continuously variable transmission (transmission) 40 that changes the speed ratio γ of the rotary power transmitted from the forward/reverse travel switching mechanism 30.

More specifically, in this embodiment, the electronic control unit 80 is further connected to a temperature sensor (not shown) for detecting the temperature T of the lubricating oil in the continuously variable transmission 40. Then, the determination section 88 determines that the hydraulic oil amount Q in the torque converter 20 when the temperature (that is, a detection value of the temperature sensor) T of the lubricating oil in the continuously variable transmission 40 is a specified threshold temperature T1 or lower, and determines that the hydraulic oil amount Q in the torque converter 20 is sufficient when the temperature T of the lubricating oil in the continuously variable transmission 40 is higher than the specified threshold temperature T1.

This determination is made in consideration of a fact that, when the hydraulic oil amount Q in the torque converter 20 is insufficient, the rotary power that is transmitted to the continuously variable transmission 40 is reduced, and thus the temperature T of the lubricating oil in the continuously variable transmission 40 is less likely to be increased.

According to this embodiment, it is determined that the hydraulic oil amount Q in the torque converter 20 is insufficient when the temperature T of the lubricating oil in the continuously variable transmission 40 is the specified threshold temperature T1 or lower. Therefore, it is possible by using the temperature T of the lubricating oil in the continuously variable transmission 40 to determine whether the hydraulic oil amount in the torque converter 20 is insufficient.

Third Embodiment

In the first embodiment, it is determined whether the hydraulic oil amount Q in the torque converter 20 is insufficient on the basis of the differential rotation ΔN between the engine speed NE and the turbine rotational speed NT. However, in this embodiment, it is determined whether the hydraulic oil amount Q in the torque converter 20 is insufficient on the basis of a rest time Δt from the stop of the engine 10.

More specifically, in this embodiment, the electronic control unit 80 includes a timer (not shown) for measuring the rest time Δt from the stop of the engine 10. Then, the determination section 88 determines that the hydraulic oil amount Q in the torque converter 20 is insufficient when the rest time Δt is a specified threshold time Δt1 or longer, and determines that the hydraulic oil amount in the torque converter 20 is sufficient when the rest time Δt is shorter than the specified threshold time Δt1.

This determination is made in consideration of a fact that the hydraulic oil amount naturally discharged from the torque converter 20 is increased (that is, the hydraulic oil amount Q in the torque converter 20 is reduced) as the rest time Δt from the stop of the engine 10 is extended.

According to this embodiment, it is determined that the hydraulic oil amount Q in the torque converter 20 is insufficient when the rest time Δt from the stop of the engine 10 is a specified threshold time Δt1 or longer. Therefore, it is possible by using the rest time Δt from the stop of the engine 10 to determine whether the hydraulic oil amount Q in the torque converter 20 is insufficient.

<<Supplementary Items>>

The description has been made so far on the preferred embodiments of the present invention with reference to the accompanying drawings. However, it is needless to say that the present invention is not limited to such embodiments. It is apparent that those skilled in the art can easily arrive at various modifications or changes within the scope of the claims, and it is understood that these modifications or changes are naturally included in the technical scope of the present invention.

It is also understood that an invention realized by combination of any of the first to third embodiments is naturally included in the technical scope of the present invention.

The present invention is a hydraulic control device for a vehicle drive apparatus and is particularly effective when it is applied to a hydraulic control device that uses one control valve for controlling a hydraulic oil pressure of a traveling frictional engagement element in a forward/reverse travel switching mechanism and a hydraulic oil amount of a torque converter.

What is claimed is:

1. A hydraulic control device for a vehicle including an engine, the hydraulic control device comprising:
a torque converter configured to transmit rotary power of the engine via hydraulic oil;
a forward-reverse travel switching mechanism including a frictional engagement element for travel that is engaged or disengaged based on a hydraulic oil pressure, the forward-reverse travel switching mechanism configured to switch a rotational direction of the rotary power transmitted from the torque converter by engagement or disengagement of the frictional engagement element;
a control valve configured to change a hydraulic oil amount in the torque converter and the hydraulic oil pressure of the forward-reverse travel switching mechanism by changing a single controlled hydraulic pressure; and
an electronic control unit configured to control the single controlled hydraulic pressure of the control valve to control the hydraulic oil amount in the torque converter and the hydraulic oil pressure of the forward-reverse travel switching mechanism, the electronic control unit configured to increase the single controlled hydraulic pressure when the hydraulic oil amount in the torque converter is insufficient at a start of the engine or immediately after the start of the engine than that when the hydraulic oil amount in the torque converter is sufficient at the start of the engine or immediately after the start of the engine.

2. The hydraulic control device according to claim 1, wherein
the electronic control unit is configured to control the single controlled hydraulic pressure to a minimum hydraulic pressure that is required for the engagement of the frictional engagement element when the hydraulic oil amount in the torque converter is sufficient, and
the electronic control unit is configured to control the single controlled hydraulic pressure to a hydraulic pressure that is higher than the minimum hydraulic pressure when the hydraulic oil amount in the torque converter is insufficient.

3. The hydraulic control device according to claim 1, wherein
the electronic control unit is configured to determine that the hydraulic oil amount in the torque converter is insufficient when differential rotation between a rotational speed of the engine and a rotational speed of a turbine runner in the torque converter is specified differential rotation or higher.

4. The hydraulic control device according to claim 1, further comprising:
a transmission configured to change a speed ratio of the rotary power that is transmitted from the forward-reverse travel switching mechanism,
wherein the electronic control unit is configured to determine that the hydraulic oil amount in the torque converter is insufficient when a temperature of lubricating oil in the transmission is a specified temperature or lower.

5. The hydraulic control device according to claim 1, wherein
the electronic control unit is configured to determine that the hydraulic oil amount in the torque converter is insufficient when a rest time from a stop of the engine is a specified time or longer.

6. A control method of a hydraulic control device for a vehicle including an engine, the hydraulic control device including a torque converter, a forward-reverse travel switching mechanism, a control valve configured to change a hydraulic oil amount in the torque converter and a hydraulic oil pressure of the forward-reverse travel switching mechanism by changing a single controlled hydraulic pressure, and an electronic control unit,
the control method comprising:
controlling the single controlled hydraulic pressure of the control valve by the electronic control unit to control the hydraulic oil amount in the torque converter and the hydraulic oil pressure of the forward-reverse travel switching mechanism, and
increasing the single controlled hydraulic pressure by the electronic control unit when the hydraulic oil amount in the torque converter is insufficient at a start of the engine or immediately after the start of the engine than that when the hydraulic oil amount in the torque converter is sufficient at the start of the engine or immediately after the start of the engine.

* * * * *